United States Patent [19]

Averill

[11] Patent Number: 4,741,236
[45] Date of Patent: May 3, 1988

[54] APPARATUS FOR NOTCHING THE BACK OF A BOOK

[75] Inventor: James S. Averill, Plattsburg, N.Y.

[73] Assignee: Harris Graphics Corporation, Melbourne, Fla.

[21] Appl. No.: 897,205

[22] Filed: Aug. 18, 1986

[51] Int. Cl.[4] .............................................. B26D 3/06
[52] U.S. Cl. ....................................... 83/876; 83/671; 83/917; 412/16
[58] Field of Search ................. 83/876, 917, 671, 875, 83/483; 412/16, 37; 409/199, 201, 204, 215, 216, 142, 157, 172, 203; 144/89; 51/90

[56] References Cited

U.S. PATENT DOCUMENTS

| | | | |
|---|---|---|---|
| 1,248,252 | 11/1917 | Bredenberg | 83/917 |
| 1,642,866 | 9/1927 | Ackley | 412/16 |
| 1,786,168 | 12/1930 | Patton | 83/876 |
| 2,679,901 | 6/1954 | Cahan | 412/16 |
| 2,918,759 | 12/1959 | Konazewski et al. | 51/90 |

Primary Examiner—E. R. Kazenske
Assistant Examiner—Eugenia A. Jones
Attorney, Agent, or Firm—Tarolli, Sundheim & Covell

[57] ABSTRACT

An apparatus for notching the back of a book. The apparatus includes a conveyor for moving the book along a conveyor path with the back of the book exposed. A cutter is provided for forming notches in the back of the book. A cutter support disc supports the cutter adjacent the conveyor path and supports the cutter for movement along a path extending transverse to the conveyor path. A first drive is connected with the cutter support dics for moving the cutter along a path extending transverse to the conveyor path. The first drive is operable in a timed relationship with the conveyor to form notches in the back of the book. A second drive is connected with the cutter for moving the cutter relative to the cutter support disc to form notches in the back of the book. The second drive is operable independent of the first drive to maintain the cutter at a speed sufficient to form notches in the back of the book regardless of the speed of movement of the cutter support disc.

11 Claims, 2 Drawing Sheets

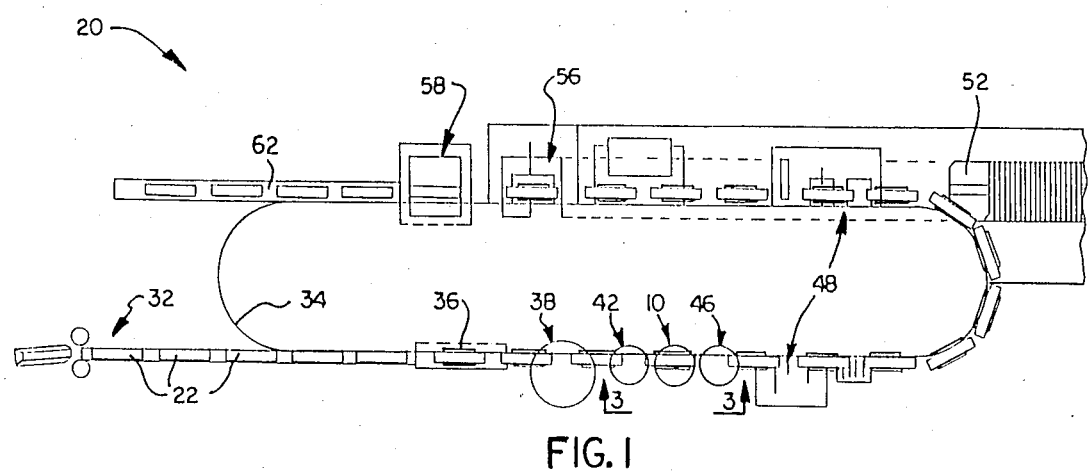
FIG. 1
FIG. 2
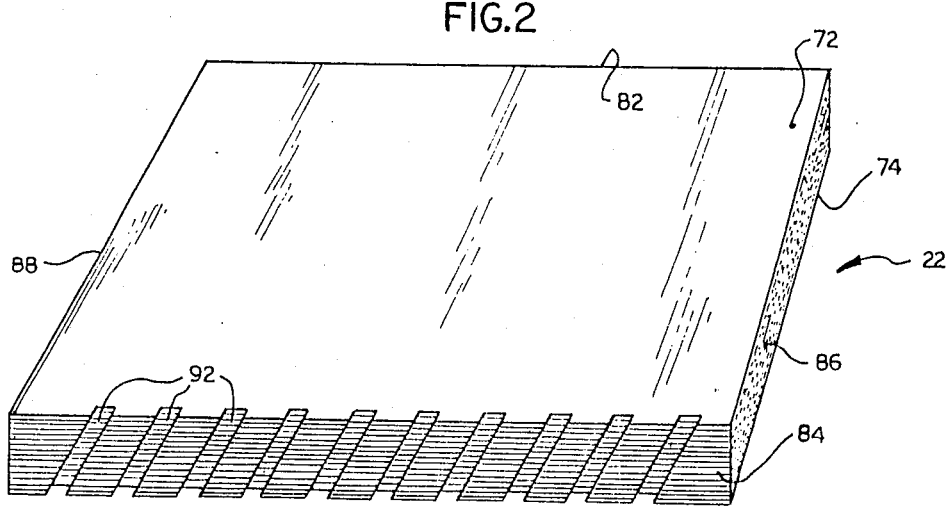
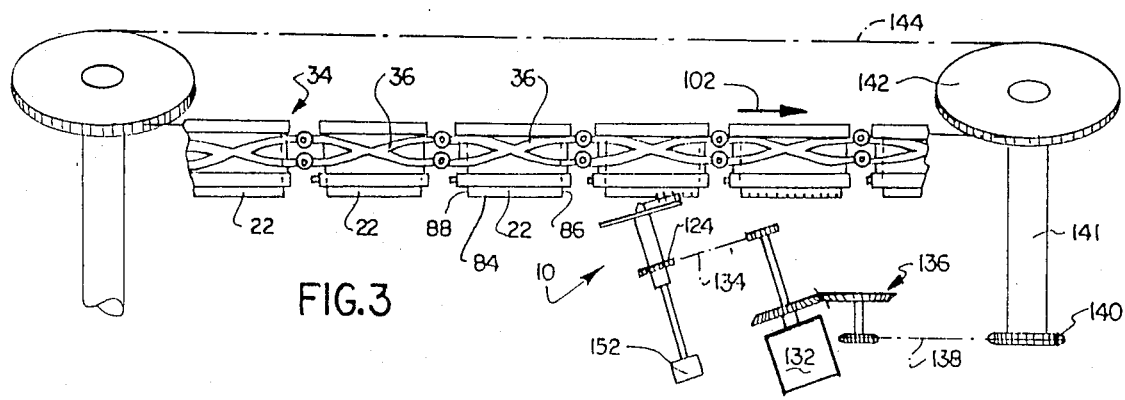
FIG. 3

APPARATUS FOR NOTCHING THE BACK OF A BOOK

BACKGROUND OF THE INVENTION

The present invention relates to book binding and particularly to preparing the back of the book for adhesive binding.

It is well known that it is desirable to notch the back of a book in order to properly prepare the book for adhesive binding. Notching the back of the book provides additional surface area for the adhesive to contact to better hold the pages of the book together. U.S. Pat. No. 1,248,252 discloses such a notching mechanism. Notching essentially shears away portions of the back of the book to leave a groove extending across the back of the book. The cutter blades used to form the notches must move through the book with a force sufficient to shear away those portions without otherwise tearing or ripping the book. To generate the sufficient force, the cutter blades move at a relatively high rate of speed.

The cutter blades of known binder notching mechanisms are typically driven by a drive for the book conveyor. Often the drive must be stopped or slowed to access the binder which also stops or slows the speed of the cutter blades. When the conveyor is then accelerated back to a desired operating speed, the cutter blades must also accelerate to sufficient speed to form the notches. However, while the cutter blades are accelerating, the back of the book may become damaged due to tearing or ripping or may not receive the quality notch which is needed to properly bind the book. Also, the notching mechanism of U.S. Pat. No. 1,248,252 is mounted to move with the book being notched. This results in a very complicated structure.

Therefore, a need exists for a notching mechanism which will move cutter blades at a sufficient speed to form good quality notches in the back of the book and which is of a simplified construction.

SUMMARY OF THE INVENTION

The present invention is directed to an apparatus for forming notches in the back of a book. The present invention provides an apparatus of relatively simple construction and which maintains cutter blades at a speed sufficient to form notches in the back of the book independent of the conveyor speed.

The present invention includes conveyor means for moving a book along a conveyor path with the back of the book exposed. Cutter means forms notches in the back of the book as the book moves along the conveyor path past the cutter means. The cutter means has at least one cutter blade supported on at least one respective shaft for rotation about the axis of the shaft. A rotatable cutter support disc supports the cutter means adjacent the conveyor path. Rotation of the support disc moves the cutter means along a path transverse to the conveyor path to thereby form notches in the book. First drive means is connected with the cutter support disc to rotate the cutter support disc along a path extending transverse to the conveyor path. The first drive means is timed relative to the movement of the conveyor means so that the cutter means forms notches in the back of the book at desired locations. Second drive means is connected with the cutter blade for rotating the cutter blade relative to the cutter support disc at a speed independent of the speed of the conveyor means and the cutter support disc.

BRIEF DESCRIPTION OF THE DRAWINGS

Further features of the present invention will become apparent to those skilled in the art to which the present invention relates from a reading of the following specification made with reference to the accompanying drawings, in which:

FIG. 1 is a schematic top view of a book binder incorporating a notching apparatus of the present invention;

FIG. 2 is a perspective view of a book havinq notches formed in the back, thereof by the present invention;

FIG. 3 is a schematic side view of a portion of the binder shown in FIG. 1;

DESCRIPTION OF A PREFERRED EMBODIMENT

Figure 4:
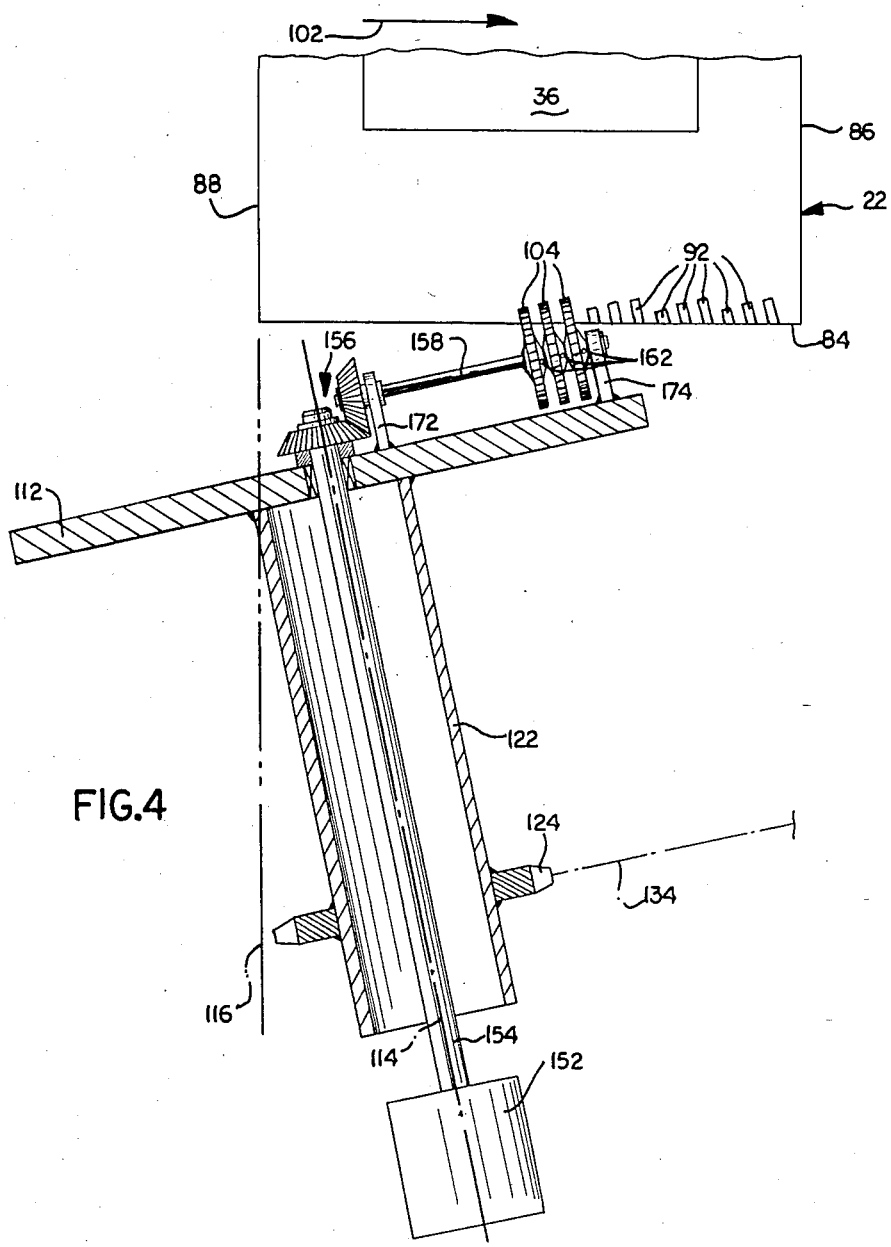
FIG. 4 is an enlarged view of the notching apparatus of the present invention.

A notching apparatus 10 (FIG. 1) for notching the back of a book is used in a binder 20, known as a perfect binder. Books 22 are directed along a book infeed 32. The books 22 are fed to a binder conveyor 34. The conveyor 34 has a plurality of book clamps 36. The books 22 are aligned with and then held by the clamps 36 for movement along a conveyor path 102 (FIG. 3). The folded portions of the signatures which comprise the backs of the books 22 (FIG. 1) are removed at a cut off station 38. A roughing station 42 roughens the backs of the books 22. The notching apparatus 10 forms notches in the backs of the books 22. Brushes 46 remove pieces of loose paper from the books 22 which result from the roughening and notching operations. Adhesive is applied to the back of the books 22 at the gluing stations 48. Covers are fed to each book 22 by cover feeder 52. The covers are attached to each of the books 22 by a cover applier 56. The covers are then broken by cover breaker 58 and each of the books 22 is released from the clamps 36 onto a delivery 62.

Each book 22 (FIG. 2) has sides 72, 74 which are engaged by the clamps 36. The books 22 also have a front 82 and a back 84. The backs 84 of the books 22 are located outside of the clamps 36 when the books are held in the clamps 36, as illustrated in FIG. 3. Each book 22 (FIG. 2) also has a leading end 86 and a trailing end 88. The leading end 86 is the forward end as the book 22 moves along the conveyor path 102.

The book 22 has notches 92 formed in the back 84 of the book 22 during the binding process. Notching the back 84 of the book 22 creates additional surface area for adhesive to engage and interconnect the pages. Adhesive binding is known in the industry and is used to bind hard and soft bound books and magazines. The notches 92 are formed at a slight angle in the back 84 of the book 22. The exact number, configuration and depth of the notches 92 can vary and are selected to meet the requirements of the particular binding run. The notches 92 are spaced from the leading end 86 and the trailing end 88 of the book. The notches 92 are illustrated as being equally spaced relative to one another.

A plurality of the books 22 (FIG. 3) move in the conveyor path 102 past the adjacent notching apparatus 10. A motor 132 drives the conveyor 34 through a gear The shaft 158 is mounted for rotation on a cutter support disc 112. An inner bearing 172 and an outer bearing 174 are fixed to the cutter support disc 112. The inner and outer bearings 172, 174 support the shaft 158 for rotation relative to the cutter support disc 112.

The position of the cutter blades 104 is axially adjustable along the length of the shaft 158. Axial adjustment of the cutter blades 104 along the shaft 158 allows the pattern of notches 92 in the back 84 of the book 22 to be varied. For example, the distance that the notches 92 will be spaced from the leading and trailing ends 86, 88 of the book 22 may be varied by changing the position of the cutter blades 104 along the shaft 158 away from the outer bearing 174. Axial adjustment may be accomplished in a variety of ways, such as by using tubular spacers (not shown) disposed on the shaft 158 and which abut the bearings 172, 174 and cutter blades 104 to space the blades along the shaft 158.

Figure 5:
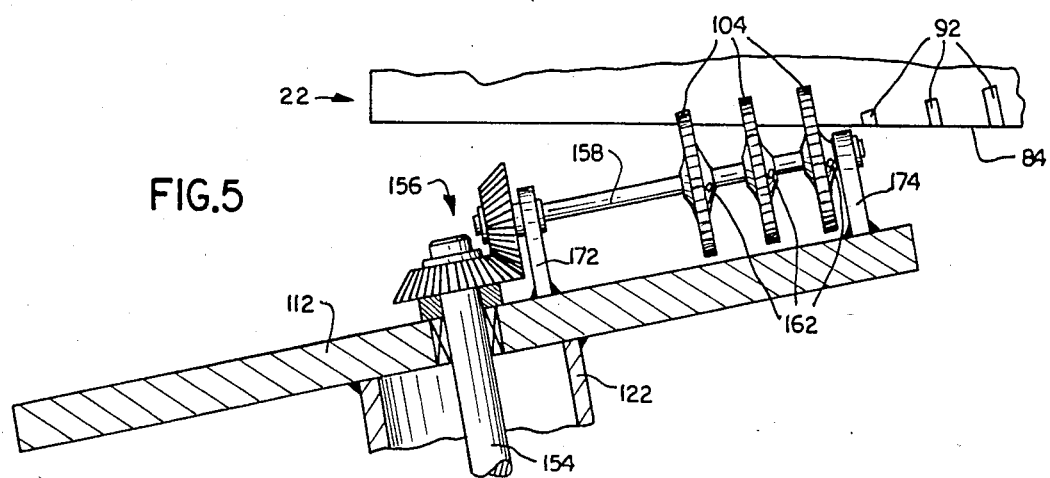
FIG. 5 is an enlarged view illustratinq another embodiment of the notching apparatus.

While one set of cutter blades 104 for cutting one notch is illustrated, additional cutter blades or sets of cutter blades could be supported on the disc circumferentially from the set 104 such as shown in dotted lines in FIG. 5 and designated 104a. This set would enable the cutter disc 112 to be rotated at a lower rotational speed for cutting a given number of notches 92 in the book 22. This would also provide a greater number arrangement 136, a chain 138, a sprocket 140 and a drive shaft 141. The drive shaft 141 is connected to another sprocket 142 which drives a chain 144. The chain 144 comprises a part of the conveyor 34 and supports the clamps 36 for movement along the conveyor path 102.

The notching apparatus 10 (FIG. 4) includes a cutter assembly for forming a notch 92 in the back 84 of a book 22 and through a part of both sides 72, 74. The cutter assembly includes a plurality of cutter blades 104 which abuttingly engage each other in a side-by-side relationship on the shaft. The number of cutting blades 104 controls the width of each notch 92 measured in the direction of conveyor movement 102. The cutter blades 104 engage the back 84 of each book 22 to form a notch 92 therein. Each cutter blade 104 is of a generally circular configuration having saw teeth circumferentially spaced about the periphery of the cutter blade. It will be apparent that the cutter blades 104 may be of various configurations. The cutter blades 104 are fixedly connected with a shaft 158 by a key (not shown) which fits into a longitudinally extending groove (not shown) in the shaft, as is known. The cutter blades 104 may be connected with the shaft 158 in a variety of other known ways. While three cutter blades 104 are illustrated as being fixed to the shaft 158, it should be apparent that other numbers of cutter blades 104 may be used. of notches 92 in the book 22 at the same rotational speed of the cutter support disc 112 as when the cutter support disc has one cutter assembly thereon.

The cutter support disc 112 rotates about an axis 114 which is skewed at an acute angle relative to an axis 116 whic is vertical to the support upon which the binder 20 is supported. The cutter support disc 112 rotates in a plane which is also skewed at an acute angle relative to the conveyor path 102. The cutter blades 104 only engage the book 22 when the cutter support disc 112 rotates the cutter blades about axis 114 to their highest vertical position. The choice of cutter blades 104, their radial distance from axis 114, and the angle at which the cutter support disc 112 is disposed are such that the cutter blades engage the back 84 of the book 22 when they are rotated to their highest vertical position and just miss the back of the book when rotated to their lowest vertical position. The books, therefore, will not have a crossed notch pattern in the back 84 of the book 22 which tends to weaken the book.

It will be apparent that the depth of the notch may be varied in various ways. For example, the cutter blades 104 could be selected from a plurality of cutter blades having different diameters. Also, it is contemplated that the bearings 172, 174 could be adjustable to raise and lower the shaft 158, or that the cutter support disc 112 is adjustable along the axis 114.

The cutter support disc 112 is fixed to a hollow shaft 122 which is connected to a sprocket 124. The motor 132 (FIG. 3) drives a chain 134 which, in turn, drives the sprocket 124 to rotate the hollow shaft 122 and cutter support disc 112 (FIG. 4) about the axis 114. Therefore, the cutter blades 104 are moved along a circular path part of which path extends transversely to the conveyor path 102.

The cutter support disc 112 is driven in a timed relationship with the conveyor 34 and at a speed proportional thereto. The cutter support disc 112 is rotated in a timed relationship with the conveyor 34 so that the cutter blades 104 engage the back 84 of the book 22 spaced from the leading and trailing ends 86, 88 of the book. This occurs for every book 22. The cutter support disc 112 rotates a plurality of times for every length of book 22 moving past the notching apparatus 10. The number of rotations that the cutter support disc 112 moves relative to the book 22 may be varied. For example, in the illustrated embodiment the book 22 (FIG. 2) has ten (10) notches 92. Thus, the cutter support disc 112 must rotate 10 times during the movement of a book 22 past the cutter support disc 112. The number of notches 92 formed in the book 22 and the spacing therebetween could be varied by changing the drive ratio between the sprocket 124 (FIG. 3) and the sprocket 140 so that the cutter support disc 112 rotates a number of times other than ten as the book moves past the cutter support disc.

The notching apparatus 10 (FIG. 4) includes a separate drive in the form of a second motor 152 for rotating the cutter blades 104. The second motor 152 is drivingly connected with a drive shaft 154. The drive shaft 154 is drivingly connected through a bevel gear arrangement 156 with the shaft 158. The drive shaft 154 is mounted coaxially inside the hollow shaft 122.

The second motor 152 is operable independently of the first motor 132. Thus, the cutter blades 104 are rotated about the axis of the shaft 158 independent of the speed of rotation of the cutter support disc 112 or speed of the conveyor 34. The cutter blades 104 are maintained at a rotational speed sufficient to form the notches 92 in the back 84 of each book 22. Thus, good quality notches 92 are formed in the back 84 of the books 22 regardless of the speed at which the cutter support disc 112 rotates or the books 22 move along the conveyor path 102.

For example, when the binder 20 is slowed or stopped, the cutter blades 104 will rotate at sufficient speed to form the notches 92 in the back of the book 22. Therefore, if the conveyor 34 and cutter support disc 112 are stopped in a position in which the cutter blades 104 still engage the back 84 of the book 22, the cutter blades continue to rotate. When the conveyor 34 and cutter support disc 112 are then moved from the stopped position, the cutter blades 104 continue to form the notches 92. It will be apparent that the conveyor 34 and cutter support disc 112 may be stopped in another position in which the cutter blades 104 do not engage the back 84 of a book 22. However, the advantage of maintaining the cutter blades 104 rotating at a cutting speed is still realized because the conveyor 34 and cutter support disc 112 cannot be accelerated to an operating speed before the cutter blades engage the book 22.

The axis 114 about which the cutter support disc 112 rotates is offset to one side of a plane in which the books 22 travel. As the cutter support disc 112 rotates about axis 114, the cutter blades 104 move along a circular path. The cutter blades 104 engage the book 22 only when the cutter blades are moving along a path which is transverse to the conveyor path 102. As the books 22 move along conveyor path 102, the cutter blades 104 engage the back 84 of each book transversely to the conveyor path along an arcuate path of a relatively large radius. Thus, the notches 92 are formed at a slight anqle in the back 84 of the book 22, as illustrated in FIG. 2. It will be apparent that the notches 92 may also have a slight arcuate configuration depending upon the thickness of the book 22, the configuration and width of the cutter blades 104, and the radial distance at which the cutter blades are located from axis 114.

From the above description of a preferred embodiment of my invention, those skilled in the art will perceive improvements, changes, and modifications. Such improvements, changes and modifications within the skill of the art are intended to be included herein and covered by the spirit and scope of the hereinafter appended claims.

Having described a preferred embodiment, I claim:

1. An apparatus for notching the back of a book, said apparatus comprising:
   conveyor means for moving the book along a conveyor path with the back exposed;
   cutter means for forming notches in the back of the book, said cutter means includes at least one blade and a cutter shaft connected with said blade and supporting said blade for rotation about a longitudinal axis of said cutter shaft;
   a cutter support disc for supporting said cutter shaft adjacent the conveyor path, said cutter support disc being rotatable about its axis for moving said cutter means along a path extending transverse to the conveyor path;
   first drive means connected with said cutter support disc for rotating said cutter support disc about the axis to form notches in the back of the book with said cutter means; and
   second drive means connected with said cutter shaft for rotating said cutter shaft about its longitudinal axis, which is coaxial with said disc axis, relative to said cutter support disc to form notches in the back of the book.

2. An apparatus as set forth in claim 1 wherein said cutter means includes means for adjusting the position of said blade along said cutter shaft.

3. An apparatus as set forth in claim 1 wherein said second drive means includes a motor drivingly connected with said cutter shaft for rotating said blade about the longitudinal axis of said cutter shaft.

4. An apparatus as set forth in claim 1 wherein said cutter support disc has at least a pair of bearing portions for receiving axially opposite end portions of said cutter shaft therein.

5. An apparatus as set forth in claim 4 wherein said cutter support disc rotates in a plane which is skewed at an acute angle relative to the conveyor path.

6. An apparatus as set forth in claim 1 further including a hollow shaft affixed to said cutter support disc for supporting said cutter support disc for rotation, said first drive means being drivingly connected with said hollow shaft for rotating said hollow shaft and cutter support disc.

7. An apparatus as set forth in claim 6 further including a drive shaft drivingly connected with said second drive means and with said cutter shaft to transmit drive forces between said second drive means and said cutter shaft, said drive shaft being at least partially disposed coaxially inside of said hollow shaft.

8. An apparatus as set forth in claim 1 wherein said second drive means is operable to maintain said cutter means at a speed sufficient to form notches in the back of the book independent of the speed of movement of said cutter support disc.

9. An apparatus as set forth in claim 1 wherein said cutter support disc is operable in a timed relationship with said conveyor means.

10. An apparatus as set forth in claim 1 wherein said second drive means is operable independent of said first drive means.

11. An apparatus as set forth in claim 1 further including a plurality of blades supported for rotation on said cutter shaft, said plurality of blades being disposed in a side-by-side abutting relationship.

* * * * *